United States Patent Office 2,707,529
Patented May 3, 1955

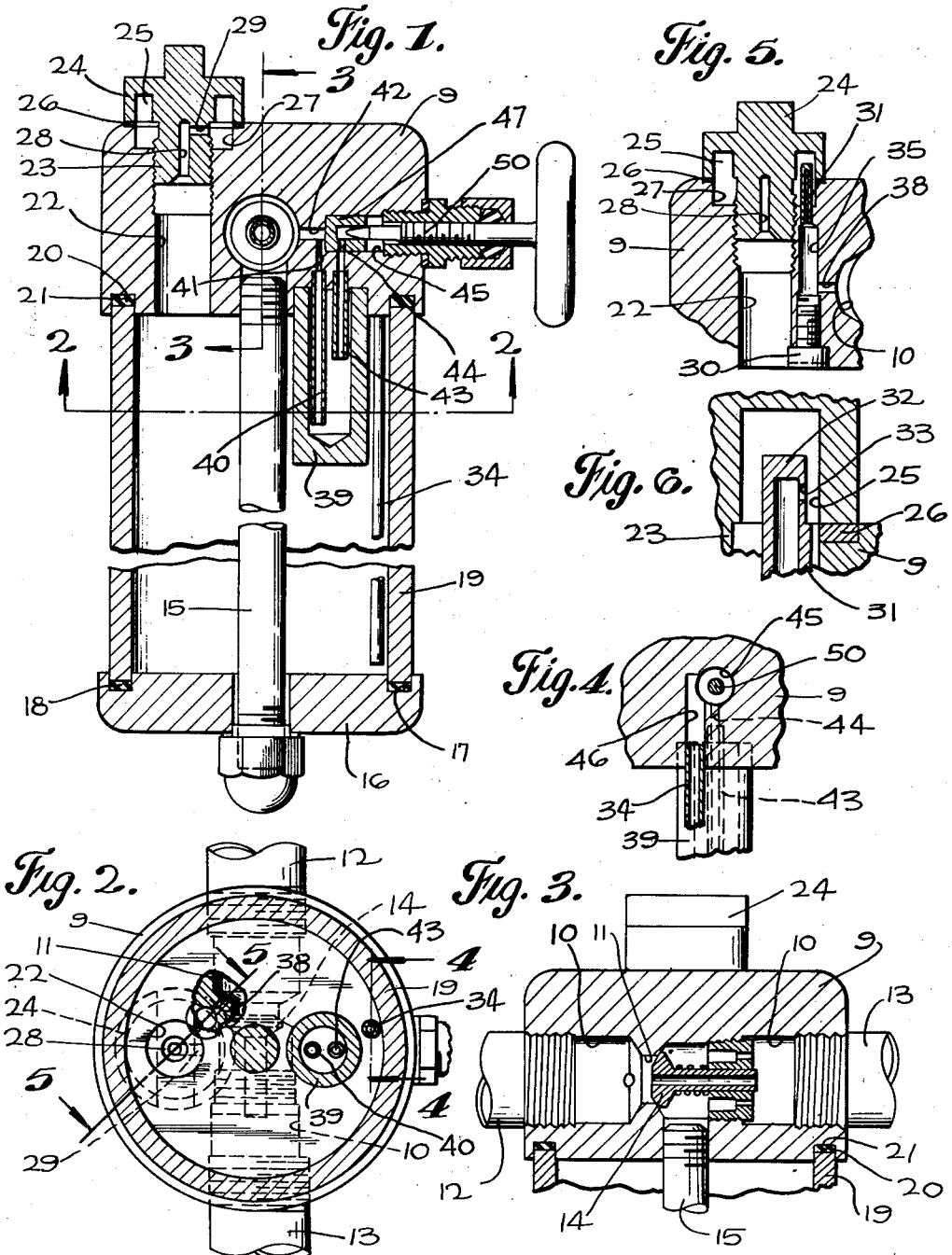

2,707,529

LUBRICATOR FOR AIR LINES

James A. Monnier, Algonac, Mich.

Application January 22, 1953, Serial No. 332,671

3 Claims. (Cl. 184—55)

My invention relates to a new and useful improvement in an air line lubricator adapted for insertion in an air line and intended to function so as to lubricate the air which passes to the pneumatically operated tube.

In this class of lubricators, there is generally provided a head having a passage formed therethrough which passage is interposed in the air line. Separated by the head and dependent therefrom is a bowl or lubricant container in which the oil or other lubricant is deposited. This filling of the bowl is usually accomplished by pouring the lubricant through a filler opening formed in the head, and which is closed by a plug when the lubricator is in use. These lubricators are so constructed that a portion of the air directed through the passage enters the bowl and establishes an air pressure on the top of the lubricant to force it upwardly through a tube into the air passage. When it is desired to fill the bowl, it is necessary to shut off the air line, as the air which enters the bowl would be emitted through the filler opening and prevent pouring of lubricant into the bowl.

It is an object of the present invention to provide an air line lubricator so arranged and constructed that when the filler opening plug is removed, it will not be necessary to shut off the air line in order to fill the bowl.

Another object of the invention is the provision of an air line lubricator so arranged and constructed that, when the plug is removed from the filler opening, the air which ordinarily enters the lubricant bowl will be by-passed so as not to enter the bowl and so as not to interfere with the pouring of lubricant into the bowl.

Another object of the invention is the provision of an air line lubricator so arranged and constructed that, when the plug is removed from the filler opening, air ordinarily entering the bowl will be by-passed so as not to enter the bowl and will, immediately upon placing the filler plug in closing position, be directed into the bowl.

Other objects will appear hereinafter.

It is recognized that various modifications and changes may be made in the detail of structure illustrated without departing from the invention, and it is intended that the present disclosures shall be considered to be but the preferred embodiment of the invention.

Forming a part of this application are drawings in which:

Fig. 1 is a longitudinal central sectional view through an air line lubricator illustrating the invention, Fig. 2 is a sectional view taken on line 2—2 of Fig. 1, Fig. 3 is a fragmentary sectional view taken on line 3—3 of Fig. 1, Fig. 4 is a fragmentary sectional view taken on line 4—4 of Fig. 2, Fig. 5 is a fragmentary sectional view taken on line 5—5 of Fig. 2, Fig. 6 is an enlarged fragmentary view of a part of the section shown in Fig. 5.

In the drawings I have shown a lubricator comprising a head 9 through which is formed a passage 10 restricted intermediate at its ends as at 11. Communicating with this passage 10 is an inlet pipe 12 and an outlet pipe 13, a suitable relief valve 14 being positioned in the passage between the ends of the pipes.

A bolt 15 is projected through a base 16 and threaded into the head 9. This base 16 is provided with a groove 17 in which is positioned a gasket 18, against which engages one end of the cylindrical bowl forming member 19. In the upper end of the member 19 engages a gasket 20, which fits in a groove 21 formed in the face of the head 9, so that upon threading the bolt 15 into the head 9, the bowl construction is mounted on the head 9 in a leak-proof condition.

Formed through the head 9 is the filler opening or passage 22 which is adapted to be closed by the screw plug 23 having the head 24 which is provided with a channel 25. When this plug is threaded into closing position, it bears, adjacent its perimeter, against a sealing gasket 26. This channel 25 is in communication with a recess 27 formed in the head 9. An axially directed passage 28 is formed in the end of the plug 23 and communicates with a lateral passage 29 which leads into the recess 27, this recess together with the channel 25 forming a chamber.

The restriction 11 in the air passage is effective in producing on the air inlet side a high pressure, and on the outlet side of this restriction an area of low pressure. Communicating with the air passage 10 on the high side is a passage 38 which communicates with the passage 35 which is closed at its bottom end by the screw 30 and in which is mounted one end of the tube 31 closed at its upper end 32, and provided with a lateral passage 33 which leads into the channel 25. The air emitted through the passage 33 into the chamber 25 is permitted to flow through the lateral passage 29 in the plug 24 and thence through the axial passage 28 into the interior of the bowl to establish air pressure on the top of the lubricant contained within the bowl. It will be noted that the lateral passage 33 is directed away from the filler opening 22. Consequently, when the plug is removed from the filler opening, the air emitted from the lateral passage 33 will pass into the atmosphere and will in no manner interfere with the pouring of lubricant through the filler opening.

The pressure on the top of the lubricant within the bowl 9 will force lubricant upwardly through the tube 34 into the passage 46 which communicates with the chamber 45 formed in the head 9. Positioned in this chamber 45 and serving as a closure for one end thereof is a valve seat or plug 47. A needle valve 50 serves to control communication of the passage 44 with the chamber 45 so that lubricant forced upwardly through the tube 34 may pass downwardly through the passage 44 and the tube 43 into the container 39. The lubricant deposited in this container 39 passes upwardly through the tube 40 and the passages 41 and 42 into the air passage 10 at the low side. This control of the flow of the lubricant from the bowl into the head and air passage formed in the head of itself forms no part of the present invention. By adjusting the needle valve 50 the amount of lubricant flowing into the member 39 may be controlled.

When these parts are assembled as described and coupled into an airline, a lubricating of the air will be easily and quickly affected, and due to the construction which permits the passage of air into the bowl, the filler plug may be removed and replaced at will without requiring the shutting off of the air line.

What I claim is:

1. In an air line lubricator having a head with an air passage formed therethrough and provided with a lubricant containing bowl, and having a filler opening formed through said head to communicate with the bowl: a tube mounted in said head adjacent the filler opening, closed at one end and extending axially of said filler opening and outwardly, at said end, beyond the surface of said head and provided with a lateral passage adjacent its closed end faced away from said opening and in spaced relation to said head, there being a passage formed in said head establishing communication of said tube with the air passage through said head; a closure plug for said filler opening for closing the same and sealing against said head, said plug having a space for reception of the closed end of said tube, said space being sealed against escape of air therefrom outwardly of said head, and there being a passage formed in said plug for establishing communication of said space with the interior of the bowl.

2. In an air line lubricator having a head with an air passage formed therethrough and provided with a lubricant containing bowl, and having a filler opening formed through said head to communicate with the bowl: a tube mounted in said head adjacent the filler opening, closed at one end and extending axially of said filler opening and outwardly, at said end, beyond the surface of said head and provided with a lateral passage adjacent its closed end faced away from said opening and in spaced relation to said head, there being a passage formed in said head establishing communication of said tube with the air passage through said head; a closure plug for said filler opening threadable thereinto; a portion of said plug engageable with said head around said opening for effecting a sealing connection therewith, said portion having a space for the reception of the closed end of said tube and said plug having a passage communicating with said space and with the interior of said bowl.

3. In an air line lubricator having a head with an air passage formed therethrough and provided with a lubricant containing bowl, and having a filler opening formed through said head to communicate with the bowl: a tube mounted in said head adjacent the filler opening, closed at one end and extending axially of said filler opening and outwardly, at said end, beyond the surface of said head and provided with a lateral passage adjacent its closed end faced away from said opening and in spaced relation to said head, there being a passage formed in said head establishing communication of said tube with the air passage through said head, said head having in its end face, around said filler opening, a recess; a closure plug threadable into said filler opening for closing the same; a portion of said plug extending radially outwardly beyond said filler opening and engageable with said head for effecting a leak-proof connection therewith, said portion having a channel communicating with said recess for forming therewith a chamber, said closed end of said tube projecting into said chamber, and said plug having a passage formed therein for establishing communication of said chamber with the interior of said bowl.

References Cited in the file of this patent
UNITED STATES PATENTS

| | | |
|---|---|---|
| 1,501,917 | Peters | July 22, 1924 |
| 2,572,440 | Brush | Oct. 23, 1951 |